United States Patent
Seo et al.

(10) Patent No.: US 9,955,524 B2
(45) Date of Patent: Apr. 24, 2018

(54) COMMUNICATION METHOD AND DEVICE OF TERMINAL IN WIRELESS COMMUNICATION SYSTEM

(71) Applicant: LG ELECTRONICS INC., Seoul (KR)

(72) Inventors: Dongyoun Seo, Seoul (KR); Joonkui Ahn, Seoul (KR); Bonghoe Kim, Seoul (KR); Yunjung Yi, Seoul (KR); Daesung Hwang, Seoul (KR); Hyangsun You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 123 days.

(21) Appl. No.: 14/763,482

(22) PCT Filed: Jan. 28, 2014

(86) PCT No.: PCT/KR2014/000777
§ 371 (c)(1),
(2) Date: Jul. 24, 2015

(87) PCT Pub. No.: WO2014/116078
PCT Pub. Date: Jul. 31, 2014

(65) Prior Publication Data
US 2015/0359036 A1     Dec. 10, 2015

Related U.S. Application Data

(60) Provisional application No. 61/757,644, filed on Jan. 28, 2013.

(51) Int. Cl.
*H04W 76/04*      (2009.01)
*H04W 72/12*      (2009.01)
(Continued)

(52) U.S. Cl.
CPC ..... *H04W 76/048* (2013.01); *H04W 52/0206* (2013.01); *H04W 72/1294* (2013.01); *H04W 36/04* (2013.01); *Y02B 60/50* (2013.01)

(58) Field of Classification Search
None
See application file for complete search history.

(56) References Cited

U.S. PATENT DOCUMENTS

| | | |
|---|---|---|
| 2010/0184450 A1 | 7/2010 | Chen et al. |
| 2011/0070845 A1 * | 3/2011 | Chen ............... H04L 5/001 455/91 |

(Continued)

FOREIGN PATENT DOCUMENTS

| | | |
|---|---|---|
| EP | 2453706 | 5/2012 |
| JP | 2011097373 A | 5/2011 |

(Continued)

OTHER PUBLICATIONS

Catt, "Considerations on E-PDCCH search space design", 3GPP TSG RAN WG1 Meeting #68bis, R1-121102, Mar. 20, 2012, 3 pages.

(Continued)

*Primary Examiner* — Edan Orgad
*Assistant Examiner* — Saumit Shah
(74) *Attorney, Agent, or Firm* — Lee Hong Degerman Kang Waimey

(57) ABSTRACT

Provided are a communication method of a terminal in a wireless communication system and the terminal using the method. The method comprises: receiving a cell state signal from a small cell; and communicating with the small cell on the basis of the cell state signal, wherein the cell state signal includes information indicating the switching of the small cell to an off-state.

10 Claims, 11 Drawing Sheets

(51) Int. Cl.
*H04W 52/02* (2009.01)
*H04W 36/04* (2009.01)

(56) References Cited

U.S. PATENT DOCUMENTS

| | | | |
|---|---|---|---|
| 2011/0130142 A1 | 6/2011 | Hsu et al. | |
| 2011/0171985 A1* | 7/2011 | Papasakellariou | H04W 72/02 455/509 |
| 2011/0223913 A1 | 9/2011 | Kho et al. | |
| 2011/0268032 A1* | 11/2011 | Kim | H04L 1/1671 370/328 |
| 2012/0176926 A1* | 7/2012 | Jang | H04W 24/02 370/252 |
| 2012/0178444 A1 | 7/2012 | Wang et al. | |
| 2012/0214498 A1 | 8/2012 | Joko | |
| 2013/0039202 A1* | 2/2013 | Feuersanger | H04L 5/001 370/252 |
| 2013/0089075 A1 | 4/2013 | Lim | |
| 2013/0272232 A1* | 10/2013 | Dinan | H04W 52/386 370/329 |
| 2014/0029486 A1* | 1/2014 | Li | H04L 5/1469 370/280 |
| 2015/0189627 A1 | 7/2015 | Yang et al. | |
| 2015/0257163 A1* | 9/2015 | Dalsgaard | H04W 72/042 455/452.2 |

FOREIGN PATENT DOCUMENTS

| | | | |
|---|---|---|---|
| WO | 2011125849 A1 | 10/2011 | |
| WO | 2012002766 A2 | 1/2012 | |
| WO | WO 2012130179 A1 * | 10/2012 | H04L 5/1469 |
| WO | 2014007593 A1 | 1/2014 | |

OTHER PUBLICATIONS

Research in Motion, UK Limited, "Signalling methods for TDD UL/DL reconfiguration with different time scales", 3GPP TSG RAN WG1 Meeting #72 , R1-130389, Jan. 19, 2013, 4 pages.
European Patent Office Application No. 14743560.6, Search Report dated Aug. 30, 2016, 6 pages.
PCT International Application No. PCT/KR2014/000777, Written Opinion of the International Searching Authority dated May 13, 2014, 1 page.

* cited by examiner

COMMUNICATION METHOD AND DEVICE OF TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2014/000777, filed on Jan. 28, 2014, which claims the benefit of U.S. Provisional Application No. 61/757,644, filed on Jan. 28, 2013, the contents of which are all hereby incorporated by reference herein in their entirety.

BACKGROUND OF THE INVENTION

Field of the Invention

The present invention concerns wireless communications, and more specifically, to methods for performing communication by user equipments (UEs) in a wireless communication system where a plurality of small cells are arranged and UEs using the methods.

Related Art

3GPP (3rd Generation Partnership Project) TS (Technical Specification) Release 8-based LTE (long term evolution) is a mobile communication standard.

Currently, 3GPP LTE-A (advanced), an evolution version of 3GPP LTE, is being standardized. A technique adopted by 3GPP LTE-A is carrier aggregation.

Carrier aggregation uses multiple component carriers. Each component carrier is defined with a center frequency and a bandwidth. One downlink component carrier or a pair of uplink component carrier and downlink component carrier corresponds to one cell. A user equipment (UE) receiving services using a plurality of downlink component carriers may be said to receive services from a plurality of serving cells. Conventionally, carrier aggregation presumes that a single base station located in the same site assign a plurality of cells, i.e., a plurality of frequency bands, to the UE and support the UE.

Meanwhile, in the next-generation wireless communication system, a plurality of base stations present in different sites may be assigned to a single UE to support the UE. Each base station may use different cells, i.e., different frequency bands, and a particular base station may be in the relationship of controlling the other base stations.

In such system, each base station may operate in an ON or OFF state. A need exists for a method for effectively signaling the UE with the ON/OFF state of each base station. Further, it needs to be specified how the UE receiving the signal is to operate.

SUMMARY OF THE INVENTION

An object of the present invention is to provide a method for performing communication by a user equipment (UE) in a wireless communication system and a UE using the method.

In an aspect, provided is a method for performing communication by a user equipment (UE) in a wireless communication system. The method includes receiving a cell state signal from a small cell and communicating with the small cell based on the cell state signal, wherein the cell state signal includes information indicating a shift of the small cell to an OFF state.

In another aspect, provided is a user equipment (UE). The UE includes a radio frequency (RF) unit transmitting and receiving a radio signal and a processor connected with the RF unit. The processor receives a cell state signal from a small cell and communicates with the small cell based on the cell state signal, wherein the cell state signal includes information indicating a shift of the small cell to an OFF state.

In a wireless communication system where a plurality of small cells are arranged, even when the small cells dynamically change their ON/OFF state, communication may be efficiently performed.

DESCRIPTION OF EXEMPLARY EMBODIMENTS

A user equipment (UE) may be stationary or mobile, and the UE may be referred to as a mobile station (MS), a mobile terminal (MT), a user terminal (UT), a subscriber station (SS), a wireless device, a personal digital assistant (PDA), a wireless modem, or a handheld device.

The base station generally denotes a fixed station that communicates with a UE, and the base station may be referred to as an eNB (evolved-NodeB), a BTS (Base Transceiver System), or an access point.

Communication from a base station to a UE is denoted downlink (DL), and communication from a UE to a base station is denoted uplink (UL). A wireless communication system including a base station and a UE may be a time division duplex (TDD) system or a frequency division duplex (FDD) system. A TDD system is a wireless communication system using different times on the same frequency band to perform uplink and downlink communication. An FDD system is a wireless communication system using different frequency bands to simultaneously perform uplink and downlink communication. The wireless communication system may perform communication using radio frames.

Figure 1:
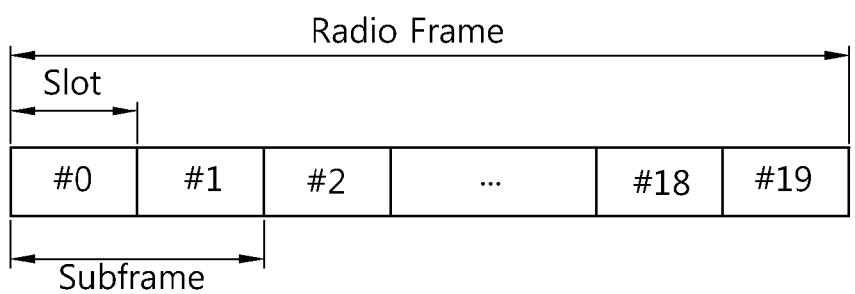
FIG. 1 illustrates the structure of an FDD radio frame.

FIG. 1 illustrates the structure of an FDD radio frame.

An FDD radio frame includes ten consecutive subframes. One subframe includes two consecutive slots. The slots included in the radio frame may be indexed 0 to 19. The time taken for one subframe to be transmitted is denoted a transmission time interval (TTI), and the TTI may be a minimum scheduling unit. For example, one subframe may be 1 ms long, and one slot may be 0.5 ms long. The FDD radio frame may be hereinafter abbreviated as an FDD frame.

Figure 2:
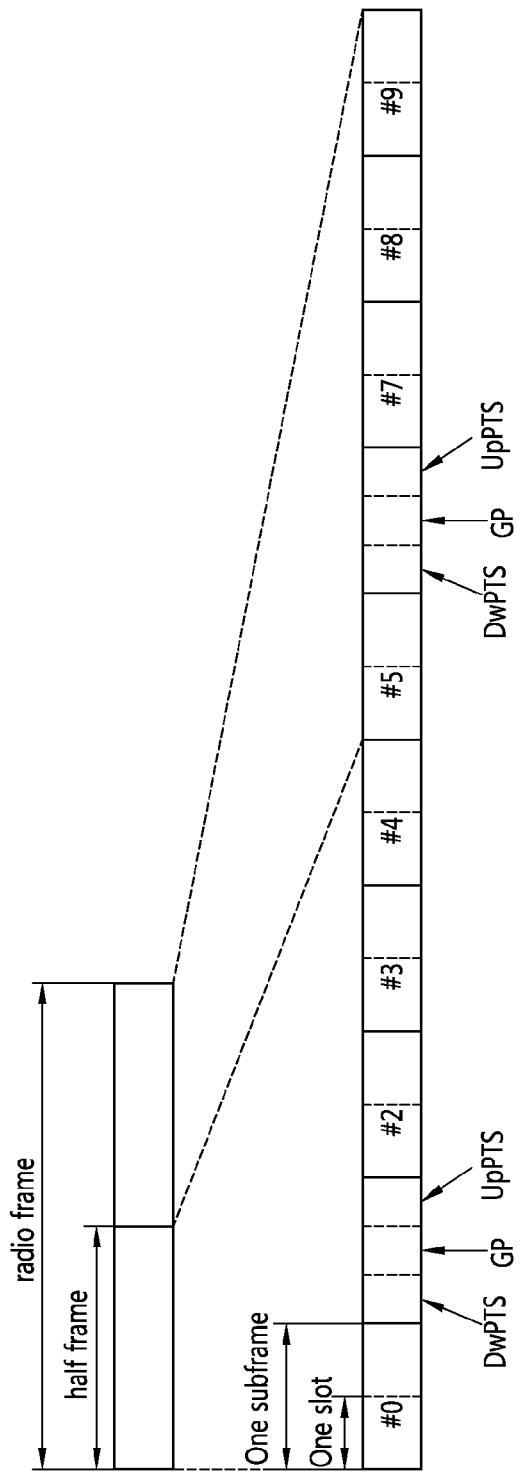
FIG. 2 illustrates the structure of a TDD radio frame.

FIG. 2 illustrates the structure of a TDD radio frame.

Referring to FIG. 2, a TDD radio frame used in TDD includes both a downlink (DL) subframe and an uplink (UL) subframe. Table 1 shows an example of a UL-DL configuration of the radio frame.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' denotes a DL subframe, 'U' a UL subframe, and 'S' a special subframe. When receiving the UL-DL configuration from the base station, the UE may be aware of whether each subframe in the radio frame is a DL subframe or a UL subframe. Hereinafter, for UL-DL configuration N (N is one of 0 to 6), the above Table 1 may be referenced.

In the TDD frame, subframes index #1 and index #6 may be special subframes, and a special subframe includes a DwPTS (Downlink Pilot Time Slot: DwPTS), a GP(Guard Period), and a UpPTS(Uplink Pilot Time Slot). The DwPTS is used for initial cell detection, synchronization, or channel estimation by the terminal. The UpPTS is used for channel estimation by the base station and sync in uplink transmission between the terminal and the terminal. The GP is a section for removing interference that occurs in the uplink due to a multi-path delay of a downlink signal between the uplink and the downlink. Hereinafter, the TDD radio frame may be abbreviated as a TDD frame.

Figure 3:
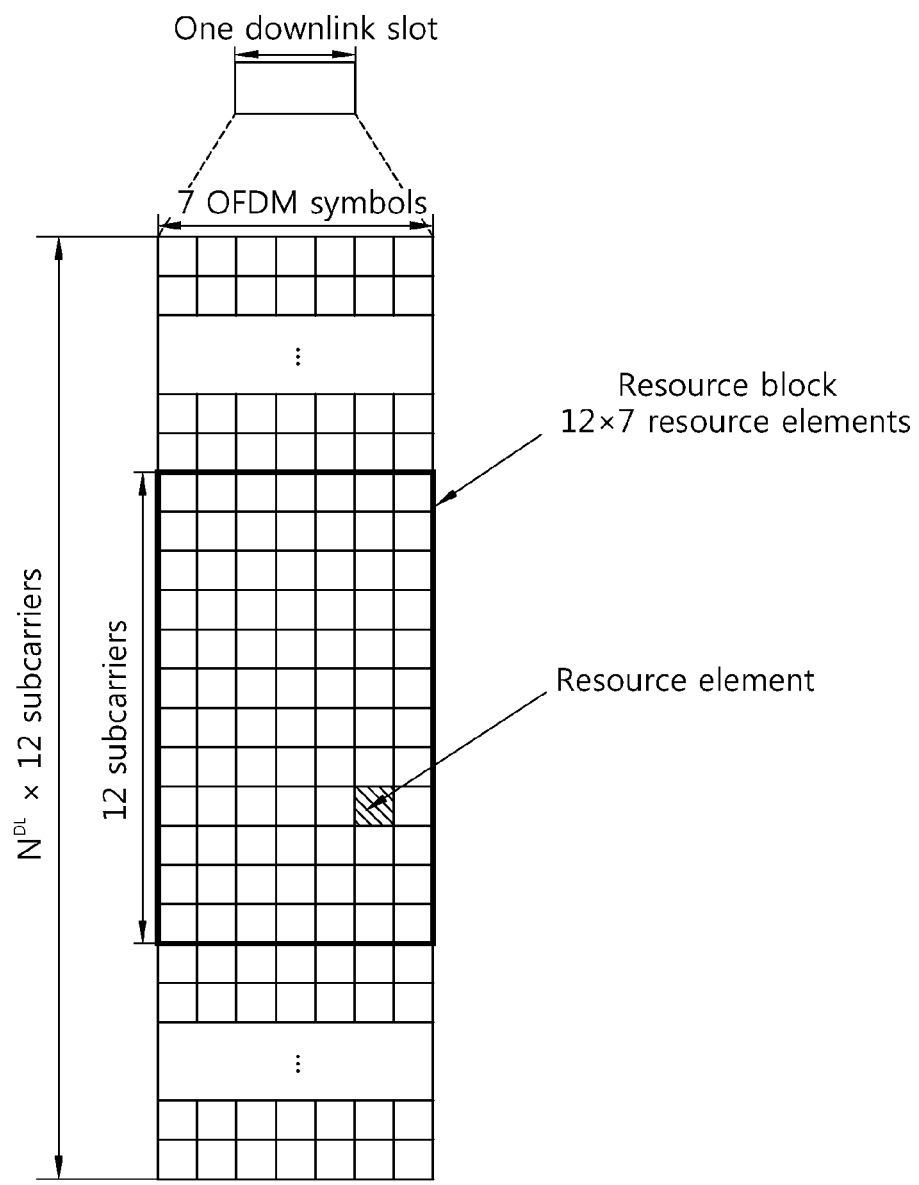
FIG. 3 illustrates an exemplary resource grid for a downlink slot.

FIG. 3 illustrates an exemplary resource grid for a downlink slot.

Referring to FIG. 3, the downlink slot includes a plurality of orthogonal frequency division multiplexing (OFDM) symbols in the time domain and $N_{RB}$ resource blocks (RBs) in the frequency domain. The resource block is a resource allocation unit and includes one slot in the time domain and a plurality of consecutive subcarriers in the frequency domain. $N_{RB}$, the number of resource blocks included in the downlink slot, depends upon a downlink transmission bandwidth $N^{DL}$ set in the cell. For example, in the LTE system, $N_{RB}$ may be any one of 6 to 110. The uplink slot may be identical in structure to the downlink slot.

Each element on the resource grid is referred to as a resource element (RE). Each resource element on the resource grid may be identified by an index pair (k,l). Here, k(k=0, . . . , $N_{RB} \times 12-1$) is an index of a sub-carrier in the frequency domain, and l (l=0, . . . , 6) is an OFDM symbol index in the time domain.

Although an example is described in which one resource block includes seven OFDM symbols in the time domain and 12 subcarriers in the frequency domain, i.e., 7×12 resource elements, the number of OFDM symbols and the number of subcarriers in the resource block are not limited thereto. The number of OFDM symbols and the number of subcarriers may be varied depending on the length of CP or frequency spacing. The number of OFDM symbols in the slot may be seven for normal cyclic prefix (CP) and six for extended CP. The number of subcarriers in one OFDM symbol may be one of 128, 256, 512, 1024, 1536, and 2048.

Figure 4:
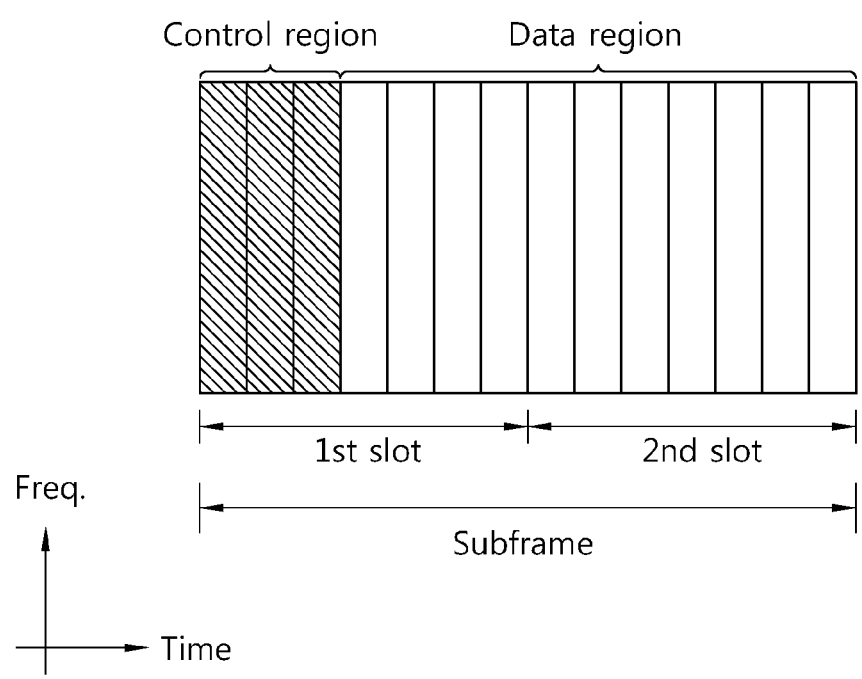
FIG. 4 illustrates the structure of a downlink (DL) subframe.

FIG. 4 illustrates the structure of a downlink (DL) subframe.

Referring to FIG. 4, the DL subframe is divided into a control region and a data region in the time domain. The control region includes up to first three (in some cases, four) OFDM symbols in the first slot in the subframe. However, the number of OFDM symbols included in the control region may be varied. A physical downlink control channel (PDCCH) and other control channels are assigned to the control region, and a physical downlink shared channel (PDSCH) is assigned to the data region.

As set forth in 3GPP TS 36.211 V8.7.0, 3GPP LTE physical channels may be divided into data channels including PDSCH(Physical Downlink Shared Channel) and PUSCH(Physical Uplink Shared Channel) and control channels including PDCCH(Physical Downlink Control Channel), PCFICH(Physical Control Format Indicator Channel), PHICH(Physical Hybrid-ARQ Indicator Channel) and PUCCH(Physical Uplink Control Channel).

The PCFICH transmitted in the first OFDM symbol of the subframe carries a control format indicator (CFI) regarding the number of OFDM symbols used to transmit the control channels in the subframe (i.e., size of the control region). The UE first receives the CFI over the PCFICH and monitors the PDCCH. Unlike the PDCCH, the PCFICH does not use blind decoding and is transmitted through a fixed PCFICH resource of the subframe.

The PHICH carries an acknowledgement (ACK)/not-acknowledgement (NACK) for an uplink hybrid automatic repeat request (HARM). That is, the ACK/NACK signal for the uplink data over the PUSCH transmitted by the UE is transmitted by the base station over the PHICH.

The physical broadcast channel (PBCH) is transmitted in the first four OFDM symbols of the second slot of the first subframe of the radio frame. The PBCH carries system information necessary for the UE to communicate with the base station, and the system information carried through the PBCH is denoted an MIB (master information block). In comparison, the system information transmitted over a PDSCH, as indicated by a PDCCH, is denoted an SIB (system information block).

The control information transmitted through the PDCCH is denoted downlink control information (DCI). The DCI may include resource allocation of the PDSCH (this is also denoted a downlink (DL) grant), resource allocation of the PUSCH (this is also denoted an uplink (UL) grant), a set of transmit power control commands for individual UEs in any UE group and/or activation of voice over Internet protocol (VoIP). The DCI has various formats and this is described below.

The control region in the subframe includes a plurality of control channel elements (CCEs). A CCE is a logical unit of allocation, which is used to provide a PDCCH with a coding rate depending on the state of a radio channel, and the CCE corresponds to a plurality of REGs (resource element groups). An REG includes a plurality of resource elements. The format of the PDCCH and the number of bits of the PDCCH that may be formatted are determined depending on the relationship between the number of CCEs and a coding rate provided by the CCEs.

One REG includes four REs, and one CCE includes nine REGs. In order to configure one PDCCH, {1, 2, 4, 8} CCEs may be used, and each element of {1, 2, 4, 8} is referred to as a CCE aggregation level.

The number of CCEs used to transmit the PDDCH is determined by the base station depending on channel states.

Figure 5:
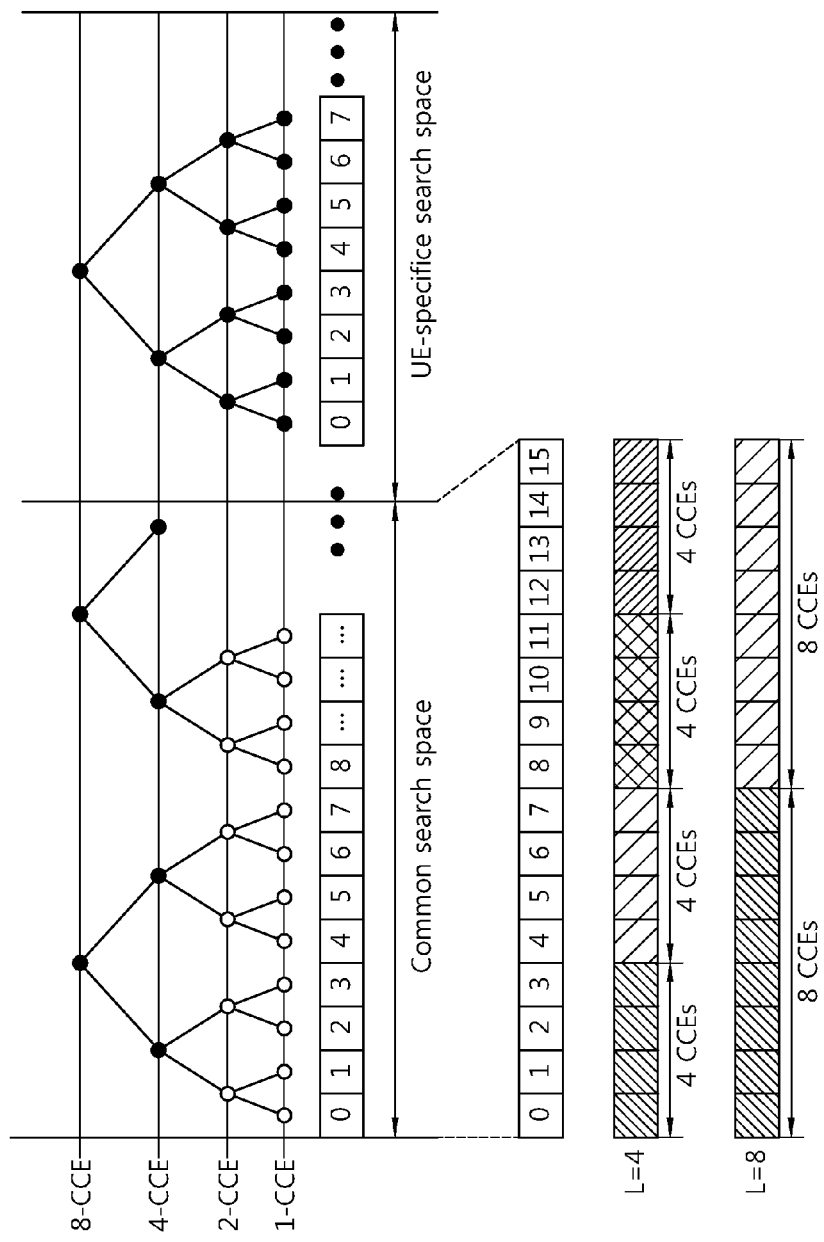
FIG. 5 is a view illustrating a common search space and a UE-specific search space for monitoring the PDCCH.

FIG. 5 is a view illustrating a common search space and a UE-specific search space for monitoring the PDCCH.

3GPP LTE uses blind decoding to detect the PDCCH. Blind decoding is the scheme of identifying whether a PDCCH is its own control channel by demasking a desired identifier to the cyclic redundancy check (CRC) of the received PDCCH (this is denoted a PDCCH candidate) to check a CRC error. The UE is unaware that its PDCCH is transmitted at what position in the control region using what CCE aggregation level or DCI format.

A plurality of PDCCHs may be transmitted in one subframe. The terminal monitors a plurality of PDCCHs in each subframe. Here, the term "monitoring" refers to the UE attempting to decode a PDCCH depending on each PDCCH format.

3GPP LTE uses a search space to reduce a load due to blind decoding. A search space may be a monitoring set of CCEs for the PDCCH. The UE monitors the PDCCH in a corresponding search space.

Search spaces may be divided into a common search space (CSS) and a UE-specific search space (USS). The common search space is a space for searching for a PDCCH having common control information, and the common search space includes 16 CCEs from CCE index 0 to CCE index 15, and the common search space supports PDCCHs having CCE aggregation levels {4, 8}. However, the PDCCH (DCI formats 0 and 1A) carrying UE-specific information may be transmitted in the common search space. The UE-specific search space supports the PDCCH having CCE aggregation levels of {1, 2, 4, 8}.

Different start points are defined for the common search space and the UE-specific search space, respectively. The start point of the common search space may be fixed regardless of subframes, but the start point of a terminal-specific SRS may be varied for each subframe depending on terminal identifiers (e.g., C-RNTI), CCE aggregation levels, and/or slot numbers in a radio frame. In case the start point of a UE-specific search space is within a common search space, the terminal-specific SRS and the common search space may overlap each other.

Now described are legacy DCI formats transmitted over the PDCCH.

A DCI format includes fields to be described below, and each field may be mapped to information bits $a_0$ to $a_{A-1}$. Each field may be mapped in the order described in each DCI format, and each field may include '0' padding bits. The first field may be mapped to information bit $a_0$ with the lowest order, and other consecutive fields may be mapped to information bits with higher orders. The most significant bit (MSB) in each field may be mapped to the information bit with the lowest order in the field. For example, the MSB of the first field may be mapped to $a_0$. Hereinafter, a set of the fields included in each legacy DCI format is denoted an information field.

1. DCI Format 0

DCI format 0 is used for PUSCH scheduling in one uplink cell. Information (field) transmitted through DCI format 0 is as follows.

1) Carrier indicator field (CIF, the same below). The carrier indicator field may include 0 or three bits. 2) Flag to distinguish DCI format 0 from DCI format 1A (0 indicates DCI format 0, and 1 indicates DCI format 1A), 3) frequency hopping flag (one bit), 4) resource block designation and hopping resource allocation, 5) modulation and coding scheme and redundancy version (five bits), 6) new data indicator (one bit), 7) TPC command for scheduled PUSCH (two bits), 8) cyclic shift and OCC(orthogonal cover code) index for DM-RS (three bits), 9) UL index (two bits), 10) downlink assignment index (DAI) (only for TDD), 11) CSI request, 12) SRS (sounding reference signal) request (this field is present only in the DCI formats scheduling PUSCH mapped to the UE-specific search space), 13) resource allocation type (this field is present only when the number of resource blocks allocated to the downlink is not less than the number of resource blocks allocated to the uplink). When the number of information bits in DCI format 0 is smaller than the payload size of DCI format 1A, '0' is padded to make it equal to the payload size of DCI format 1.

2. DCI Format 1

DCI format 1 is used for scheduling one PDSCH codeword in one cell. The following information is transmitted in DCI format 1.

1) carrier indicator field (0 or three bits), 2) resource allocation header (indicates resource allocation type 0/type 1)-when the downlink bandwidth is smaller than 10PRBs, no resource allocation header is included and is assumed to resource allocation type 0. 3) resource block designation, 4) modulation and coding scheme (five bits), 5) HARQ process number (three bits in FDD, four bits in TDD), 6) new data indicator (one bit), 7) redundancy version (two bits), 8) TPC command for PUCCH (two bits), 9) downlink assignment index (DAI) (two bits, TDD only), 10) HARQ-ACK resource offset (two bits). When the number of information bits of DCI format 1 is the same as DCI format 0/1A, one bit having a value of '0' is added to DCI format 1. When the number of information bits in DCI format 1 is equal to any one of {12, 14, 16, 20, 24, 26, 32, 40, 44, 56}, bits having one or more '0s' are added to DCI format 1, making its payload size different from {12, 14, 16, 20, 24, 26, 32, 40, 44, 56} and the payload size of DCI format 0/1A.

3. DCI Format 1A

DCI format 1A is used for compact scheduling of one PDSCH codeword or a random access process induced by a PDCCH command in one cell. The DCI corresponding to the PDCCH command may be transferred through the PDCCH or an enhanced PDCCH (EPDCCH).

The following information is transmitted in DCI format 1A. 1) carrier indicator field (0 or three bits), 2) flag (one bit) to distinguish DCI format 0 from DCI format 1A, 3) localized/distributed virtual resource block (VRB) designation flag (one bit), 4) resource block designation, 5) preamble index (six bits), 6) physical random access channel (PRACH) mask index (four bits), 7) modulation and coding scheme (five bits), 8) HARQ process number (three bits), 9) new data indicator (one bit), 10) redundancy version (two bits), 11) TPC command for PUCCH (two bits), 12) downlink assignment index (DAI) (two bits) (TDD only), 13) SRS request (0 or one bit), 14) HARQ-ACK resource offset (two bits). When the number of information bits of DCI format 1A is smaller than the number of information bits of DCI format 0, bits having '0s' are added to make it the same as the payload size of DCI format 0. When the number of information bits of DCI format 1A is the same as any one of {12, 14, 16, 20, 24, 26, 32, 40, 44, 56}, bits having 0s are added to DCI format 1A.

4. DCI format 1B

DCI format 1B includes precoding information and is used for compact scheduling on one PDSCH codeword in one cell. The following information is transmitted in DCI format 1B.

1) carrier indicator field (0 or three bits), 2) localized/distributed VRB designation flag (one bit), 3) resource block designation, 4) modulation and coding scheme (five bits), 5) HARQ process number (three bits), 6) new data indicator (one bit), 7) redundancy version (two bits), 8) TPC command for PUCCH (two bits), 9) downlink assignment index (DAI, two bits, TDD only), 10) transmitted precoding matrix indicator (TPMI) information for precoding, 11) PMI identification for precoding (one bit). When the number of information bits of DCI format 1B is the same as any one of {12, 14, 16, 20, 24, 26, 32, 40, 44, 56}, one bit having 0 is added to DCI format 1B.

5. DCI Format 1C

DCI format 1C is used for very compact scheduling of one PDCCH codeword and notification of change of multicast control channel (MCCH). For the former case, the following information is transmitted in DCI format 1C. 1) indicator indicating a gap value (one bit), 2) resource block designation, 3) modulation and coding scheme. For the latter case, the following information is transmitted in DCI format 1C. 1) information for notifying change of MCCH (eight bits), 2) reserved information bits.

6. DCI Format 1D

DCI format 1D includes precoding and power offset information and is used for compact scheduling on one PDSCH codeword in one cell.

The following information is transmitted in DCI format 1D.

1) carrier indicator field (0 or three bits), 2) localized/distributed VRB designation flag (one bit), 3) resource block designation, 4) modulation and coding scheme (five bits), 5) HARQ process number (three bits in FDD and four bits in TDD), 6) new data indicator (one bit), 7) redundancy version (two bits), 8) TPC command for PUCCH (two bits), 9) downlink assignment index (DAI, two bits, TDD only), 10) transmitted precoding matrix indicator (TPMI) information for precoding, 11) downlink power offset (one bit), 12) HARQ-ACK resource offset (two bits). When the number of information bits of DCI format 1D is the same as any one of {12, 14, 16, 20, 24, 26, 32, 40, 44, 56}, one bit having 0 is added to DCI format 1D.

7. DCI Format 2

DCI format 2 is used to designate a PDSCH for closed loop MIMO operation. The following information is transmitted in DCI format 2.

1) carrier indicator field (0 or three bits), 2) resource allocation header (one bit), 3) resource block designation, 4) TPC command for PUCCH (two bits), 5) downlink assignment index (DAI, two bits, TDD only), 6) HARQ process number (three bits in FDD and four bits in TDD), 7) transport block to codeword swap flag (one bit), 8) modulation and coding scheme (five bits), 9) new data indicator (one bit), 10) redundancy version (two bits), 11) precoding information, 12) HARQ-ACK resource offset. 8) to 10) above may be given for each transport block.

8. DCI Format 2A

DCI format 2A is used to designate a PDSCH for open loop MIMO operation. The following information is transmitted in DCI format 2A.

1) carrier indicator field (0 or three bits), 2) resource allocation header (one bit), 3) resource block assignment, 4) TPC command for PUCCH (two bits), 5) downlink assignment flag (DAI, two bits, TDD only), 6) HARQ process number (three bits in FDD and four bits in TDD), 7) transport block to codeword swap flag (one bit), 8) modulation and coding scheme (five bits), 9) new data indicator (one bit), 10) redundancy version (two bits), 11) precoding information, 12) HARQ-ACK resource offset.

9. DCI Format 2B

The following information is transmitted in DCI format 2B.

1) carrier indicator field (0 or three bits), 2) resource allocation header (one bit), 3) resource block assignment, 4) TPC command for PUCCH (two bits), 5) downlink assignment flag (DAI, two bits, TDD only), 6) HARQ process number (three bits in FDD and four bits in TDD), 7) scrambling identity (ID) (one bit), 8) SRS request (0 or one bit), 9) modulation and coding scheme (five bits), 10) new data indicator (one bit), 11) redundancy version (two bits), 12) HARQ-ACK resource offset.

10. DCI Format 2C

The following information is transmitted in DCI format 2C.

1) carrier indicator field (0 or three bits), 2) resource allocation header (one bit), 3) resource block assignment, 4) TPC command for PUCCH (two bits), 5) downlink assignment flag (DAI, two bits, TDD only), 6) HARQ process number (three bits in FDD and four bits in TDD), 7) antenna port, scrambling identity (ID), and number of layers (three bits), 8) SRS request (0 or one bit), 9) modulation and coding scheme (five bits), 10) new data indicator (one bit), 11) redundancy version (two bits), 12) HARQ-ACK resource offset.

11. DCI Format 2D

The following information is transmitted in DCI format 2D.

1) carrier indicator field (0 or three bits), 2) resource allocation header (one bit), 3) resource block assignment, 4) TPC command for PUCCH (two bits), 5) downlink assignment flag (DAI, two bits, TDD only), 6) HARQ process number (three bits in FDD and four bits in TDD), 7) antenna port, scrambling identity (ID), and number of layers (three bits), 8) SRS request (0 or one bit), 9) modulation and coding scheme (five bits), 10) new data indicator (one bit), 11) redundancy version (two bits), 12) PDSCH resource element mapping and quasi-co-location indicator, 13) HARQ-ACK resource offset.

12. DCI Format 3

DCI format 3 is used to transmit TPC command for PUCCH and PUSCH through two bits of power control. N transmit power control (TPC) commands may be transmitted in DCI format 3.

13. DCI Format 3A

DCI format 3A is used to transmit TPC command for PUCCH and PUSCH through one bit of power control. M transmit power control (TPC) commands may be transmitted in DCI format 3A.

14. DCI Format 4

DCI format 4 is used for scheduling of PUSCH in one UL cell having multiple antenna port transmission modes.

1) carrier indicator field (0 or three bits), 2) resource block allocation, 3) TPC command for PUSCH (two bits), 4) cyclic shift and OCC index for DM RS (three bits), 5) UL index (two bits), 6) downlink assignment flag (DAI, two bits, TDD only), 7) CSI request (one or two bits), 8) SRS request (two bits), 9) resource allocation type (one bit), 10) modulation and coding scheme and redundancy version (five bits), 11) new data indicator (one bit), 12) precoding information and number of layers.

Figure 6:
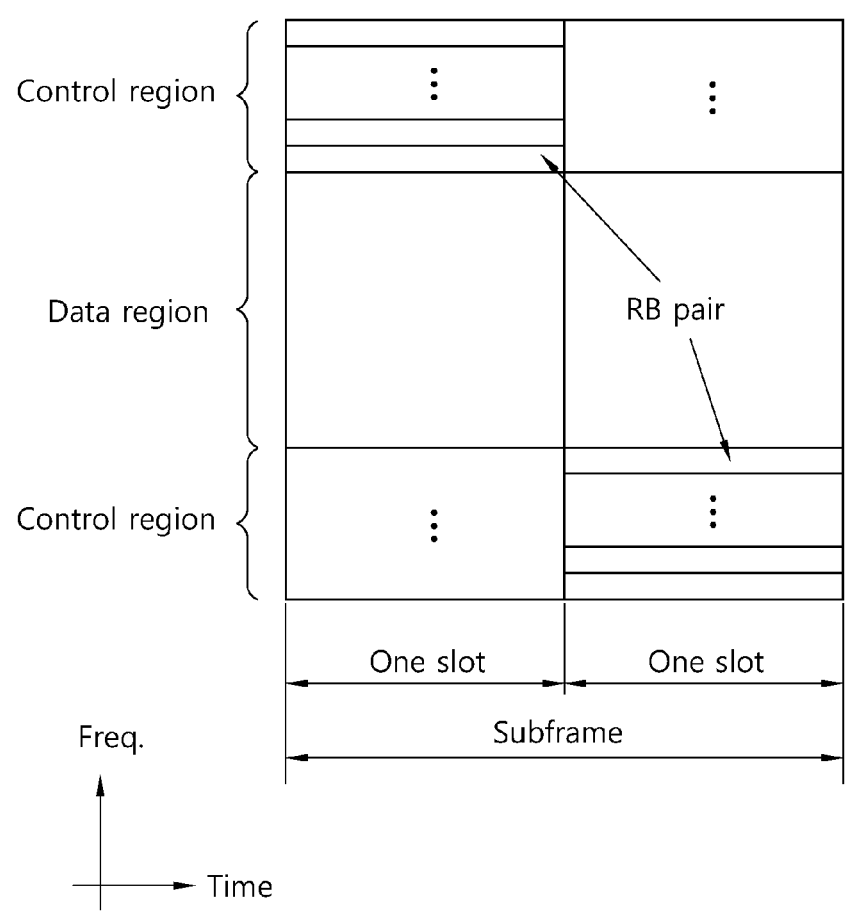
FIG. 6 illustrates the structure of an uplink subframe.

FIG. 6 illustrates the structure of an uplink subframe.

Referring to FIG. 6, the uplink subframe may include a control region to which a physical uplink control channel (PUCCH) carrying uplink control information in the frequency domain is allocated and a data region to which a physical uplink shared channel (PUSCH) is allocated carrying user data.

The PUCCH is allocated in an RB pair in the subframe. The RBs in the RB pair occupy different subcarriers in the first and second slots, respectively. The RB pair has the same resource block index m.

As per 3GPP TS 36.211 V8.7.0, the PUCCH supports multiple formats. Depending on modulation schemes dependent upon the PUCCH formats, the number of bits transmitted per subframe may be varied.

The following Table 2 represents examples of modulation schemes and the number of bits per subframe depending on PUCCH formats.

TABLE 2

| PUCCH Format | Modulation scheme | Number of bits per sub frame |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

PUCCH format 1 is used for transmission of a scheduling request (SR). PUCCH format 1a/1b is used for transmission of an ACK/NACK signal for HARQ. PUCCH format 2 is used for transmission of a CQI. PUCCH format 2a/2b is used for simultaneous transmission of CQI and ACK/NACK signal. When only ACK/NACK signal is transmitted in the subframe, PUCCH format 1a/1b is used, and when the SR alone is transmitted, PUCCH format 1 is used. When the SR and ACK/NACK are simultaneously transmitted, PUCCH format 1 is used, and in this case, the ACK/NACK signal is modulated in the resource allocated to the SR and is then transmitted.

In addition to the above-described PUCCH formats, there is PUCCH format 3.

PUCCH format 3 is a PUCCH format using a block spreading scheme. The block spreading scheme means a method for spreading symbol sequences obtained by modulating the multi-bit ACK/NACK using a block spreading code in the time domain.

In PUCCH format 3, the symbol sequence (e.g., ACK/NACK symbol sequence) is spread by the block spreading code and is transmitted in the time domain. As the block spreading code, an orthogonal cover code (OCC) may come in use. Control signals from several UEs may be multiplexed by the block spreading code. In PUCCH format 2, UE multiplexing is conducted using cyclic shift of the constant amplitude zero auto-correlation sequence. By contrast, in PUCCH format 3, a symbol sequence including one or more symbols is transmitted over each data symbol in the frequency domain, and is spread by the block spreading code in the time domain, thereby achieving UE multiplexing.

Now described is a carrier aggregation system. The carrier aggregation system is also referred to as a multi-carrier system.

3GPP LTE systems are supportive of configurations in which a downlink bandwidth is different from an uplink bandwidth, which, however, assumes a single component carrier. 3GPP LTE systems may support up to 20 MHz with different bandwidths between uplink and downlink, and the systems are supportive of only one CC for each of uplink and downlink.

Carrier aggregation (also referred to as bandwidth aggregation or spectrum aggregation) supports multiple CCs. For example, allocation of five CCs each with a carrier bandwidth granularity of 20 MHz would support a bandwidth up to 100 MHz.

Figure 7:
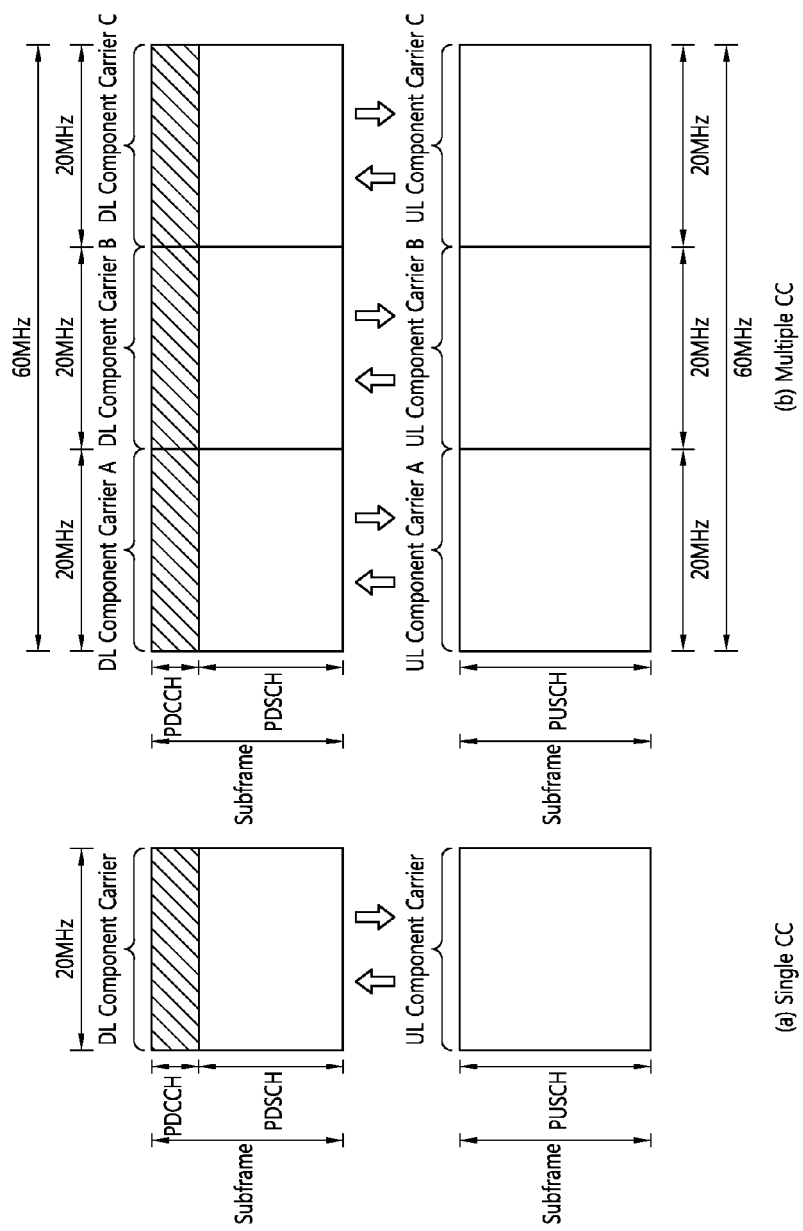
FIG. 7 illustrates an example of comparing a single carrier system and a carrier aggregation system.

FIG. 7 illustrates an example of comparing a single carrier system and a carrier aggregation system.

The carrier aggregation system (FIG. 7(b)) has three DL CCs and three UL CCs are shown, but the number of DL CCs and UL CCs is not limited. A PDCCH and a PDSCH may be independently transmitted on each DL CC, and a PUCCH and a PUSCH are independently transmitted on each UL CC. Or, the PUCCH may be transmitted through only a particular UL CC.

Since three DL CC-UL CC pairs are defined, a UE may be considered to be served from three cells. Hereinafter, the cell configured to provide a service to the UE is denoted as a serving cell.

The UE may monitor the DL CCs and the PDCCHs and the UE may receive DL transport blocks through the plurality of DL CCs. The UE may simultaneously transmit a plurality of UL transport blocks through the plurality of UL CCs.

A pair of DL CC #A (DL component carrier A) and UL CC #A (UL component carrier A) may be a first serving cell, a pair of DL CC #B and UL CC #B a second serving cell, and DL CC #C a third serving cell. Each serving cell may be identified through its cell index (CI). The CI may be unique to its corresponding cell or may be UE-specific.

The serving cells may be divided into a primary cell and secondary cells. The primary cell is a cell that establishes the UE's initial connection or initiates a connection reestablishment process or is indicated as a primary cell during a handover process. The primary cell is also denoted a reference cell. Each secondary cell may be configured after an RRC connection has been established. The secondary cells may be used to provide additional radio resources. At least one primary cell is always configured, and secondary cell(s) may be added/modified/released by higher layer signaling. The CI of the primary cell may be fixed. For example, the lowest CI may be designated as the CI of the primary cell.

The primary cell, in light of component carrier, includes a downlink primary component carrier (DL PCC) and an uplink primary component carrier (UL PCC). The secondary cell, in light of component carrier, may include a downlink secondary component carrier (DL SCC) only or a pair of a DL SCC and an uplink secondary component carrier (UL SCC). Hereinafter, the terms "cell" and "component carrier (CC)" may be interchangeably used.

As described above, the carrier aggregation system, unlike the single carrier system, may support a plurality of component carriers (CCs), i.e., a plurality of serving cells.

Such carrier aggregation system may support cross-carrier scheduling (CCS). The cross carrier scheduling is a scheduling scheme that enables, through a PDCCH transmitted through a particular component carrier, resource allocation of a PDSCH transmitted through another component carrier and/or resource allocation of a PUSCH transmitted through a component carrier other than the component carrier basically linked to the particular component carrier. In other words, the PDCCH and PDSCH may be transmitted through different DL CCs, and the PUSCH may be transmitted through a UL CC other than the UL CC linked with the DL CC where the PDCCH including the UL grant has been transmitted. As such, a system supportive of cross carrier scheduling needs a carrier indicator indicating the DL CC/UL CC through which the PDSCH/PUSCH to which the PDCCH provides control information is transmitted. The field including such carrier indicator is hereinafter denoted a carrier indication field (CIF).

The carrier aggregation system supporting cross carrier scheduling may include a carrier indicator field (CIF) in the legacy downlink control information (DCI) format. The system supporting cross carrier scheduling, e.g., the LTE-A system, adds a CIF to the legacy DCI format (i.e., the DCI format used in LTE). Accordingly, three bits may be extended, and the PUCCH structure may reuse the legacy coding scheme and resource allocation method (i.e., CCE-based resource mapping).

The base station may configure a PDCCH monitoring DL CC (monitoring CC) set. The PDCCH monitoring DL CC set consists of some of all the DL CCs aggregated, and if cross carrier scheduling is set, the UE performs PDCCH monitoring/decoding only on the DL CCs included in the PDCCH monitoring DL CC set. In other words, the base station transmits the PDCCH for the PDSCH/PUSCH to be scheduled only through the DL CC included in the PDCCH monitoring DL CC set. The PDCCH monitoring DL CC set may be configured UE-specifically, UE group-specifically, or cell-specifically.

The non-cross carrier scheduling (NCCS) is a scheduling scheme that enables, through a PDCCH transmitted through a particular component carrier, resource allocation of a PDSCH transmitted through the particular component carrier and/or resource allocation of a PUSCH transmitted through a component carrier basically linked to the particular component carrier.

The present invention is now described.

For a next-generation wireless communication system, various services and system configurations may be required. For example, there may be required a service to support a UE primarily performing periodic data communication, such as a machine type communication (MTC) UE and a service to support multi-user multi input multi output (MU-MIMO). Further, cell aggregation of a type different from the legacy type may be required. That is, there may be required aggregation of cells using different UL-DL configurations, aggregation of a cell using a carrier adopting the legacy channel structure and a cell using a carrier using a different channel structure than the legacy channel structure, such as a new carrier type (NCT), and aggregation of cells using different frame structures, such as a cell using a TDD frame and a cell using an FDD frame.

Further, aggregation of cells present in different sites as well as aggregation of cells present in the same site is taken into account for the next-generation wireless communication system.

That is, in the conventional cell aggregation, one base station present in the same site aggregates and uses a plurality of cells composed of different frequency bands. However, the future wireless communication system would be able to use aggregate and use cells provided from a plurality of base stations present in different sites.

Figure 8:
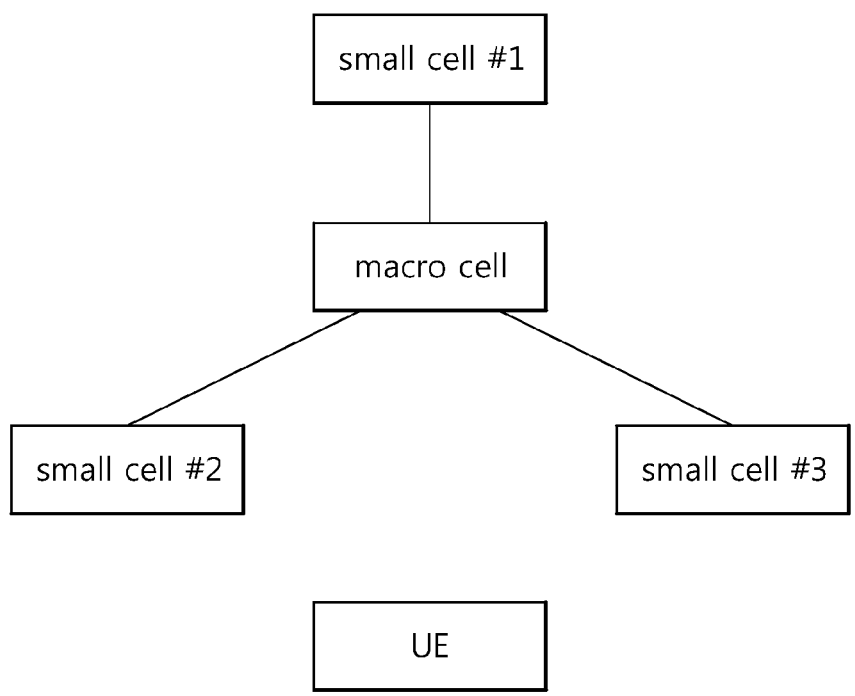
FIG. 8 illustrates an example of a wireless communication system including cells present in different sites.

FIG. 8 illustrates an example of a wireless communication system including cells present in different sites.

Referring to FIG. 8, the wireless communication system may include a macro cell and a plurality of small cells.

Here, the macro cell is a cell that statically maintains an ON state. In contrast, the small cell means a cell that may semi-statically change the state to an ON or OFF state. The small cell may use limited power or may dynamically/semi-statically switch ON/OFF to reduce interference with other adjacent cells. That is, the state of the cell may operate in either an ON or OFF state. Generally, a macro cell is a cell provided from a large-size base station and presents broad coverage. By contrast, a small cell is a cell provided from a small-size base station, such as a remote radio head (RRH) or a femto base station and provides small coverage. The macro cell and small cell may be cells including different frequency bands.

When the macro cell and small cell #2 are aggregated and provided to the UE of FIG. 8, this may be represented as cells present in different cells being aggregated and provided. In this case, on the UE's position, two different frequency bands (component carriers) end up being allocated like in the legacy carrier aggregation. However, while in the legacy carrier aggregation the two frequency bands are provided from the same base station, in aggregation of cells present in different sides, the two frequency bands are provided from different base stations, and this is a difference between the two types of aggregation.

The small cell alone may be allocated to the UE, and in this case, the small cell may operate as a primary cell. Or, the small cell may be aggregated with the macro cell and may be allocated to the UE. In such case, the macro cell may be operated as a primary cell while the small cell is operated as a secondary cell. However, although in the legacy carrier aggregation the PUCCH is transmitted only through the primary cell, the present invention is not limited thereto. In other words, the UE may transmit the PUCCH through the small cell operating as a secondary cell as well.

Hereinafter, cell aggregation means aggregation of cells present in different sites.

Only one or multiple small cells used for cell aggregation may be configured for each UE. The small cell may be configured by a higher layer signal such as an RRC.

The small cell and the macro cell may be wiredly/wirelessly connected with each other, and the small cell may be controlled by the macro cell. A control information transfer delay may occur between the macro cell and small cell or between small cells present in different sites. Accordingly, the cells respectively positioned in the sites may perform their respective scheduling.

Now described are a method for indicating a dynamic state change of a small cell and an operating method of a UE when such method applies.

I. Cell State Signal

A cell state signal is a signal informing the UE that the small cell changes its state and may include at least one of the following information.

1. Information Indicating a State Change of a Small Cell

For example, the cell state signal may include information indicating that the small cell changes from an OFF state to an ON state or from the ON state to the OFF state. Or, the cell state signal may include only information indicating that the small cell changes from the ON state to the OFF state in order to simplify the configuration of the cell state signal.

The cell state signal may also include time-related information, such as a time when the state change of the small cell applies and a time period when the state change is to apply. The UE may apply the state change of the small cell based on the time-related information after receiving the cell state signal from the small cell. For example, when receiving the information indicating that the small cell changes to the OFF state and time-related information indicating that the OFF state applies from system frame numbers N to M, the UE operates assuming that the small cell is in the OFF state from system frame N to system frame M.

The time-related information may additionally indicate the UE's handover period or a period when a delay request signal is to be transmitted. The handover period may denote a time period from when the UE receives the cell state signal until the UE applies handover. The delay request period may be a time period during which the UE may transmit a delay request signal for requesting to hold the state change of the small cell.

For the cell state signal to indicate that the small cell changes to the ON state, the signal may directly indicate that the small cell turns back to the ON state or may indirectly indicate cancellation of the OFF state of the small cell. Indication of the cell state signal regarding the change to the OFF state may be done by directly indicating that the small cell turns the OFF state or indirectly instructing handover to the macro cell or indicating that it is in a standby state for receiving a delay request signal for requesting to delay change to the OFF state.

2. The cell state signal may include information, such as the amount of loaded data of the cell (light loading, heavy loading), link quality, or transmit power size. The UE may detect its favored cell or a cell having good link quality by the information and may report to the macro cell. When a plenty of data is being transmitted to a particular UE, information for restricting the change of cell state only for the particular UE may also be contained.

3. The cell state signal may indicate a carrier index (CI) or the identifier (ID) of the target to which the UE is to hand over, i.e., the target cell.

When a particular small cell changes from the ON state to the OFF state, the particular small cell may indicate the neighboring cell to which the UE linked to the particular small cell is supposed to hand over.

The small cell may instruct the UE to move to the target cell (move command) or may provide IDs of a plurality of target cells and recommend the UE to hand over to one of the plurality of target cells. When the cross carrier scheduling includes the move command, the UE may hand over to the target cell or perform cell change. When the cell state signal includes IDs of target cells to be recommended, the UE may perform measurement on the target cells to be recommended to determine to move to a particular target cell or to report a result of the measurement.

4. The cell state signal may include information designating a PUCCH transmission cell. The UE may transmit a channel state information and an ACK/NACK through the PUCCH transmission cell.

5. The cell state signal may include information for instructing to take over the HARQ process that has been performed for a small cell whose state is to be changed from the ON state to the OFF state.

II. Cell State Signal Signaling Method

1. Signaling From Small Cell to Macro Cell

Configuration/handover/application to a secondary cell of the small cell in the wireless communication system may be controlled by the macro cell. Upon determination an ON/OFF state in the small cell, a change in state of the small cell needs to be known to the macro cell through signaling to the macro cell. The small cell may report its state change to the macro cell through a backhaul link.

When informed of the cell state change from the small cell, the macro cell may signal the cell state change to the UE receiving services through the small cell.

When the small cell is used alone, but not as a secondary cell for the macro cell, the ON/OFF state change of the small cell may be infrequent.

2. Signaling From Small Cell to UE

The small cell, when its cell state changes, may directly/indirectly report this to the UE, so that the UE may occupy/release resources according to the cell state of the small cell. That is, the small cell may send the cell state signal to the UE. What method is to be used in such case is described below in detail.

1) Cell state signal may be broadcast. For example, the cell state signal may be included in a master information block (MIB) or system information block (SIB) and may be transmitted. However, signaling of the cell state signal through the MIB or SIB may be inefficient due to a long update period of the MIB or SIB.

2) Cell state signal may be transmitted through a physical layer (layer 1: L1) signal.

In this case, one of the following two methods may come in use.

The first method is to transmit the cell state signal through a DCI masked with a new radio network temporary identifier (RNTI) for the purpose of delivering the cell state signal. The DCI may be transmitted through the PDCCH. The new RNTI may be denoted a cell-state RNTI. The cell state RNTI-masked DCI may transmit the information of the cell state signal using the field area except the cyclic redundancy check (CRC) where the cell state RNTI is masked.

The cell state RNTI-masked DCI may be transmitted through the common search space (CSS). Unless there is a CSS region like the enhanced PDCCH (EPDCCH) is used, a distributed type EPDCCH set may be used. The EPDCCH is a control channel added to the PDSCH region.

The cell state RNTI-masked DCI may use the same length as the legacy DCI format 1C/1A. In the legacy CSS, DCI format 1C/1A is transmitted. When the cell state RNTI-masked DCI is transmitted in the CSS, it ends up adding the 'DCI having only RNTI changed while having the same length as the legacy DCI format,' avoiding an increase in the number of times of blind decoding by the UE.

Meanwhile, DCI format 1A may be transmitted regardless of transmission modes in the UE-specific search space (USS). Accordingly, when the cell state RNTI-masked DCI is transmitted through the USS, it may be transmitted with the same length as DCI format 1A. It results in adding the DCI having the same length as DCI format 1A and whose RNTI only is different, preventing an increase in the number of times of blind decoding by the UE.

Meanwhile, when the cell state RNTI-masked DCI is transmitted fitting into the length of a unique DCI format that may be transmitted in each transmitted, it may result in different lengths depending on transmission modes. Therefore, when an error occurs in setting up a transmission mode, decoding may be problematic.

Meanwhile, when the information indicated by the cell state signal is simple like the ON/OFF state of the small cell, it is preferable to perform transmission, with the signal length minimized, in order for signaling efficiency.

A method for the purpose is to use a DCI configured only of a cell state RNTI as the cell state signal. In such case, a DCI having a different length than the legacy DCI format is generated, and the number of times of blind decoding may be increased. In order to prevent the increase in the number of times of blind decoding, the UE may be limited to detect the DCI configured only of the cell state RNTI only in a particular subframe. For example, it may be limited to subframe #0 or 5, a subframe transmitting a primary synchronization signal (PSS)/secondary synchronization signal (SSS), a subframe transmitting a discovery signal or a subframe transmitting an MIB.

Or, in order to prevent the increase in the number of times of blind decoding by the UE, the number of types of DCIs targeted for blind decoding in the subframe where the DCI configured only of the cell state RNTI may be reduced.

Meanwhile, the DCI masked with a new RNTI such as the cell state RNTI may be transmitted fitting into the period when paging signals are transmitted. Since the UE that is in an RRC_IDLE state wakes up to receive a paging signal, a new RNTI-masked DCI may be transmitted in consistence with the transmission period of the paging signals for the UE.

A second method is to use a DCI masked with the legacy RNTI (paging-RNTI, random access-RNTI, or selection information-RNTI) but to transmit the cell state signal through a combination of particular fields of the DCI. That is, it is to use a combination of fields that are not used in the DCI format transmitted through the CSS.

For example, the cell state signal may be represented using a combination of, e.g., the HARQ process number field and the downlink assignment index (DAI) field in DCI format 1A. Or, the cell state signal may be represented using a state unused in DCI format 1C. For example, when the redundancy version (RV) field has a particular value, no paging message and random access response (RAR) may be received. The cell state signal may be represented using such particular value.

3) Cell state signal may be included in a paging message and may be transmitted. To that end, a paging message only for a small cell may be separately configured. Or, a separate P-RNTI may be utilized.

4) Cell state signal may be transmitted through UE-specific signaling or through L1/L2 signaling. Fields/states in the legacy DCI format or MAC CE message may be combined to indicate the cell state signal.

III. Operation of UE Receiving Cell State Signal

1. The UE, when receiving a cell state signal, may attempt handover. For example, upon reception of the cell state signal indicating that a small cell present alone is to change to the OFF state from the small cell, the UE may attempt to hand over to another cell. Or, when the small cell is a cell operating as a secondary cell, it may perform an operation to change the secondary cell.

2. When receiving the cell state signal, the UE may transmit a delay request signal for requesting to delay the cell state change.

Figure 9:
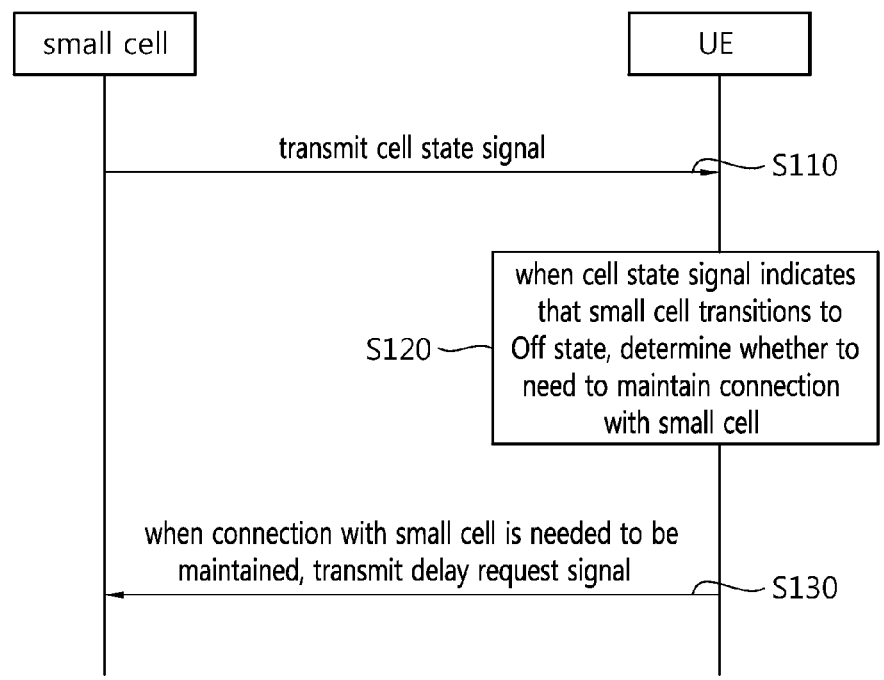
FIG. 9 illustrates an exemplary operation of a UE receiving a cell state signal.

FIG. 9 illustrates an exemplary operation of a UE receiving a cell state signal.

Referring to FIG. 9, the small cell transmits a cell state signal to the UE (S110).

When receiving the cell state signal, if the cell state signal indicates that the small cell transitions to the OFF state, the UE determines whether to need to maintain the connection with the small cell (S120).

When the connection with the small cell needs to be maintained, the UE transmits a delay request signal to the small cell (S130). The delay request signal may be directly transmitted to the small cell or may be transmitted to the macro cell so that the macro cell transfers the same to the small cell.

The delay request signal may be transmitted, e.g., when the UE fails to attempt handover or needs to communicate emergency data. That is, the delay request signal may be used to prevent the situation where the small cell arbitrarily enters the OFF state and thus the UE disconnects from the small cell despite needing a service.

The UE may transmit a signal in a particular radio resource, and the small cell, when the signal is detected from the particular radio resource, may recognize it as the delay request signal. That is, the delay request signal may be recognized by whether a signal is detected in a designated radio resource rather than by a particular bit field value. The delay request signal may be transmitted through the PUCCH.

3. The UE, upon reception of a cell state signal, may feedback an ACK/NACK indicating whether reception of the cell state signal succeeds or fails.

Figure 10:
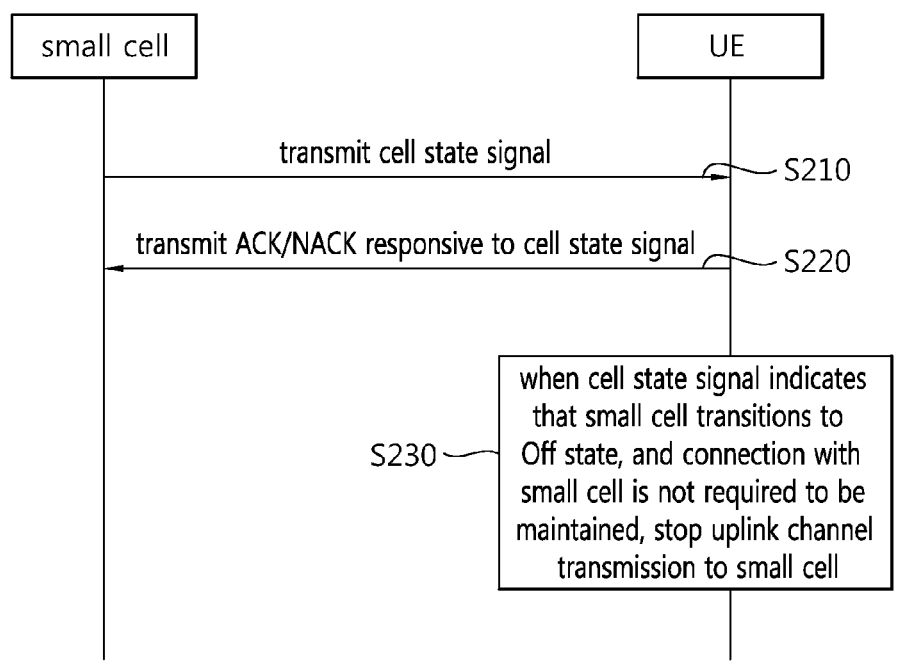
FIG. 10 illustrates another exemplary operation of a UE receiving a cell state signal.

FIG. 10 illustrates another exemplary operation of a UE receiving a cell state signal.

The small cell transmits a cell state signal to the UE (S210).

The cell state signal may be transmitted at a predetermined period. The period may be preset by a higher layer signal such as an RRC message.

The UE may transmit an ACK/NACK responsive to the cell state signal (S220).

When the UE fails to receive the cell state signal at a predetermined period or receives the cell state signal but fails to decode it, the UE may transmit an NACK to the small cell. The small cell, when receiving the NACK, may re-transmit the cell state signal.

When ACK/NACK resources are separately assigned to all the UEs, and the small cell receives an ACK/NACK transmitted through the ACK/NACK resources, the cell state signal may be re-transmitted through a previously explicitly assigned resource. Further, when there is transmission of another data channel in a subframe transmitting the cell state signal, an ACK/NACK response field for the cell state signal may be added.

There may be an occasion where it is inefficient to assign a separate ACK/NACK to each UE. For example, when there are too many UEs, such method is inefficient. Accordingly, the small cell may assign a common resource to a plurality of UEs, and when a particular UE fails to receive the cell state signal, may enable it to send an NACK through the common resource. In such case, the small cell, upon detection of the NACK in the common resource, may recognize that at least one UE fails to receive the cell state signal.

When the UE should also send an ACK/NACK for reception of other data that is not the cell state signal in a subframe configured to transmit an ACK/NACK for the cell state signal, the ACK/NACK for the reception of the other data may have to be dropped, but this is not preferred. Accordingly, it is preferable to prevent the small cell from performing downlink scheduling for the other data in the subframe transmitting the cell state signal.

When the cell state signal indicates that the small cell transitions to the OFF state, and it is not required to maintain the connection with the small cell, the UE stops the uplink channel transmission to the small cell (S230). This stops signal transmission to the small cell that is supposed to turn the OFF state in order to prevent unnecessary resource occupation and interference with neighboring cells. This process (S230) may be performed when the UE properly receives the cell state signal.

That is, the UE may conduct allocation/release of radio resources necessary for communication with the small cell based on the cell state signal.

The uplink channel to be stopped is, e.g., the PUCCH/PUSCH. The UE may stop ACK/NACK transmission and CSI reporting that is transmitted through such channels. Further, the UE may stop sounding reference signal (SRS) transmission, semi-persistent scheduling (SPS) PUSCH, signal transmission by a random access process, and transmission of a cell measurement result.

However, when a small cell group is formed, and another small cell in the small cell group takes over the downlink channel, the uplink channel transmission may go on. When a time gap occurs between the source cell to take over and the target cell, transmission during a partial timing period may be paused and may be then resumed.

Meanwhile, although not shown in FIG. 10, the UE receiving the cell state signal may relay or report to the macro cell the state change of the small cell that has been grasped through the cell state signal.

For example, upon reception of the cell state signal indicating a change to the OFF state or to the ON state from a particular small cell, such may be reported to the macro cell. Further, the UE, when the particular small cell turns the OFF state, may have to perform handover, and in this case, it may provide information on the small cell targeted to the macro cell.

IV. Timing to Apply State Change of Small Cell According to Cell State Signal.

Generally, a signaling transfer delay or reception error is prone to occur between a transmit end and a receive end. Accordingly, a delay time needs to apply between the transmission time of cell state signal in the small cell and the reception complete time of the signal in the UE or the time to apply.

A delay time between the transmission start or end time of the cell state signal in the small cell or the time to apply an operation of the UE may be determined by one of the following methods.

1. Method of Applying Delay Time Indicated by RRC or Predetermined Delay Time.

For example, when simultaneously signaling to the macro cell and the UE the cell state signal indicating that the small cell is to transition to the OFF state, it is preferable to set the delay time based on the larger of the delay between the small cell and the UE and the delay between the small cell and the macro cell. For a simplified implementation, the time to apply the cell state change according to the cell state signal may be indicated through RRC signaling or a roomy value may be previously set and applied.

2. Method of Determining Delay Time Based on ACK/NACK Transmitted From UE.

The UE may be configured to feed back an ACK/NACK that is an acknowledgment to reception of the cell state signal. In this case, the small cell may be aware whether the UE may apply an operation according to the cell state signal based on the ACK/NACK. Accordingly, considering the time when the small cell may identify the ACK/NACK transmitted from the UE, the delay time may be determined.

When synchronization between the small cell and the UE is critical, this method may apply. For example, it is, e.g., L1/L2 handover, application of UL-DL configuration, switch of DL subframe to UL subframe, change of PUCCH transmission cell, and timing to apply stopping UL channel transmission.

V. Timing to Apply Cell State Change Considering UE's ACK/NACK Response.

Assume that the subframe where the UE receives the cell state signal without errors is n, and the subframe to apply the operation according to the same is n+x.

Assume that for the time taken for the UE to receive the PDCCH/PDSCH including the cell state signal without errors and send an ACK/NACK response thereto, a subframes are required, and for the time for the small cell to actually change the cell state or re-transmit the cell state signal responsive to the ACK/NACK response, b subframes are required. Then, x=a+b.

In the legacy LTE DL HARQ process timing relationship, a=4 and b=4 for FDD.

When the UE transmits an ACK/NACK, ACK/NACK repetition may be used. ACK/NACK repetition means that the ACK/NACK is repeatedly transmitted in N subframes (e.g., one of {2,4,6}) rather than in one subframe. ACK/NACK repetition may be set by a parameter ("ackNack-Repetition") given from a higher layer. When ACK/NACK repetition is set, the UE may transmit the ACK/NACK in $N_{ANRep}$ subframes. $N_{ANRep}$ may be set by the higher layer. For PDSCH transmission with no corresponding PDCCH, the ACK/NACK is repeatedly transmitted $N_{ANRep}$ times using resources set by the higher layer. For PDSCH transmission with a corresponding PDCCH or ACK/NACK transmission for PDCCH itself, the first ACK/NACK is transmitted using the PUCCH resource derived from the CCE index of the PDCCH, and the ACK/NACK transmission performed remaining $N_{ANRep}-1$ times is performed using the set PUCCH resource.

That is, when ACK/NACK repetition applies, the number of UL subframes where the ACK/NACK is transmitted is increased from 1 to $N_{ANRep}$.

Accordingly, as the subframes used to send the ACK/NACK response are increased ($N_{ANRep}-1$), a=4+($N_{ANRep}-1$)=$N_{ANRep}$+3. Thus, x=a+b=$N_{ANRep}$+3+4=$N_{ANRep}$+7.

To prevent a from varying depending on $N_{ANRep}$, a may be set using the largest value (6 in the following example) of $N_{ANRep}$ configurable values (this may be represented as $N_{ANRep,configurable}$. For example, $N_{ANRep,configurable} \in \{2,4,6\}$).

That is, x=a+b=max($N_{ANRep,configurable}$)+3+4=max($N_{ANRep,configurable}$)+7=6+7=13. x may be used only when ACK/NACK repetition applies or regardless of ACK/NACK repetition.

Meanwhile, for TDD, a may be defined as in the following table.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Referring to Table 3, in UL-DL configuration 0, 6 is specified in subframe 2. This means that the ACK/NACK for the cell state signal received in subframe 6 that comes six subframes before subframe 2 is transmitted in subframe 2. b may be set as follows: b=4.

The following table shows the number of subframes after which the ACK/NACK is transmitted for subframe n receiving the cell state signal.

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | | 4 | 6 | | | | — |
| 1 | 7 | 6 | | | 4 | 7 | 6 | | | 4 |
| 2 | 7 | 6 | | 4 | 8 | 7 | 6 | | 4 | 8 |
| 3 | 4 | 11 | | | | 7 | 6 | 6 | 5 | 5 |
| 4 | 12 | 11 | | | 8 | 7 | 7 | 6 | 5 | 4 |
| 5 | 12 | 11 | | 9 | 8 | 7 | 6 | 5 | 4 | 13 |
| 6 | 7 | 7 | | | | 7 | 7 | | | 5 |

That is, the above Table 4 defines m per subframe n (where, m is denoted m(n)) when the cell state signal is received in DL subframe n, and an ACK/NACK corresponding to the same is transmitted in UL subframe n+m.

Accordingly, x=a+b=m(n)+b=m(n)+4.

Generally, when ACK/NACK repetition is used, the number of UL subframes where the ACK/NACK is transmitted is increased from 1 to $N_{ANRep}$. Accordingly, a should be set further considering $N_{ANRep}-1$ UL subframes. The number of subframes required from m(n) including m(n) until transmission of $N_{ANRep}$ UL subframes is done may be set to a. Or, a sum of m(n) and the number of subframes required from m(n), excluding m(n), until transmission of $N_{ANRep}$ UL subframes is done may be set to a.

For example, when $N_{ANRep}$ is set to 4, the small cell has transmitted the cell state signal through the PDSCH in subframe 1 (i.e., n=1) of UL-DL configuration 1, and the UE has received the same without errors, the ACK/NACK response thereto is as follows: m(a)=6. Thus, transmission is started from the subframe n=7, and four UL subframes are used by ACK/NACK repetition. The four UL subframes are included in the period constituted of six subframes including subframe 7. Accordingly, a=6+6=12, and x=12+4=16.

As such, a for each DL subframe per UL-DL configuration for each of $N_{ANRep}$=2,4,6 is as shown in the following tables. Table 5 is for $N_{ANRep}$=2, Table 6 is for $N_{ANRep}$=4, and Table 7 is for $N_{ANRep}$=6.

TABLE 5

| UL-DL Configuration | Subframe n | | | | | | | | | | Max |
|---|---|---|---|---|---|---|---|---|---|---|---|
| | 0 | 1 | 2 | 3 | 4 | 5 | 6 | 7 | 8 | 9 | 23 |
| 0 | 4 + 3 | 6 + 1 | | | — | 4 + 3 | 6 + 1 | | | — | 7 |
| 1 | 7 + 1 | 6 + 1 | | | 4 + 4 | 7 + 1 | 6 + 1 | | | 4 + 4 | 8 |
| 2 | 7 + 5 | 6 + 5 | | 4 + 5 | 8 + 5 | 7 + 5 | 6 + 5 | | 4 + 5 | 8 + 5 | 13 |
| 3 | 4 + 8 | 11 + 1 | | | | 7 + 1 | 6 + 1 | 6 + 1 | 5 + 1 | 5 + 8 | 13 |
| 4 | 12 + 1 | 11 + 1 | | | 8 + 1 | 7 + 1 | 7 + 9 | 6 + 9 | 5 + 9 | 4 + 9 | 16 |
| 5 | 12 + 10 | 11 + 10 | | 9 + 10 | 8 + 10 | 7 + 10 | 6 + 10 | 5 + 10 | 4 + 10 | 13 + 10 | 23 |
| 6 | 7 + 1 | 7 + 4 | | | | 7 + 1 | 7 + 1 | | | 5 + 3 | 11 |

TABLE 6

| UL-DL Configuration | Subframe n | | | | | | | | | | Max |
|---|---|---|---|---|---|---|---|---|---|---|---|
| | 0 | 1 | 2 | 3 | 4 | 5 | 6 | 7 | 8 | 9 | 43 |
| 0 | 4 + 5 | 6 + 5 | | | — | 4 + 5 | 6 + 5 | | | — | 11 |
| 1 | 7 + 6 | 6 + 6 | | | 4 + 9 | 7 + 6 | 6 + 6 | | | 4 + 9 | 13 |
| 2 | 7 + 15 | 6 + 15 | | 4 + 15 | 8 + 15 | 7 + 15 | 6 + 15 | | 4 + 15 | 8 + 15 | 23 |
| 3 | 4 + 10 | 11 + 10 | | | | 7 + 10 | 6 + 10 | 6 + 10 | 5 + 10 | 5 + 10 | 21 |
| 4 | 12 + 11 | 11 + 11 | | | 8 + 11 | 7 + 11 | 7 + 19 | 6 + 19 | 5 + 19 | 4 + 19 | 26 |
| 5 | 12 + 30 | 11 + 30 | | 9 + 30 | 8 + 30 | 7 + 30 | 6 + 30 | 5 + 30 | 4 + 30 | 13 + 30 | 43 |
| 6 | 7 + 6 | 7 + 6 | | | | 7 + 5 | 7 + 5 | | | 5 + 8 | 13 |

TABLE 7

| UL-DL Configuration | Subframe n | | | | | | | | | | Max |
|---|---|---|---|---|---|---|---|---|---|---|---|
| | 0 | 1 | 2 | 3 | 4 | 5 | 6 | 7 | 8 | 9 | 63 |
| 0 | 4 + 9 | 6 + 9 | | | — | 4 + 9 | 6 + 9 | | | — | 15 |
| 1 | 7 + 11 | 6 + 11 | | | 4 + 14 | 7 + 11 | 6 + 11 | | | 4 + 14 | 18 |
| 2 | 7 + 25 | 6 + 25 | | 4 + 25 | 8 + 25 | 7 + 25 | 6 + 25 | | 4 + 25 | 8 + 25 | 33 |
| 3 | 4 + 19 | 11 + 12 | | | | 7 + 12 | 6 + 12 | 6 + 19 | 5 + 19 | 5 + 19 | 25 |
| 4 | 12 + 21 | 11 + 21 | | | 8 + 21 | 7 + 21 | 7 + 29 | 6 + 29 | 5 + 29 | 4 + 29 | 35 |
| 5 | 12 + 50 | 11 + 50 | | 9 + 50 | 8 + 50 | 7 + 50 | 6 + 50 | 5 + 50 | 4 + 50 | 13 + 50 | 63 |
| 6 | 7 + 10 | 7 + 10 | | | | 7 + 10 | 7 + 10 | | | 5 + 10 | 17 |

Meanwhile, a varying per subframe increases complexity. To reduce complexity, the largest a value per subframe in each UL-DL configuration may be obtained, and the same may be used as a for all of the DL subframes of the same UL-DL configuration. For example, when $N_{ANRep}=4$, and UL-DL configuration is UL-DL configuration 1, the largest a value per subframe of UL-DL configuration 1 is 13.

Or, to reduce the complexity of a varying per UL-DL configuration, the largest a value per subframe in the UL-DL configuration may first be obtained, and the largest value of the largest per-UL-DL configuration values may be set to a. For example, when $N_{ANRep}=4$, the largest per-UL-DL configuration values in the right portion of Table 6 are (11,13, 23,21,26,43,13), and the largest value of the largest values is 43. Accordingly, a=43.

Meanwhile, a look at UL-DL configuration 0 of Table 3 shows that there is a UL subframe (i.e., UL subframe n=3, 8) that does not correspond to the DL subframe. Such UL subframes may be excluded from ACK/NACK repetition.

Meanwhile, the cell where the cell state signal is transmitted may differ in UL-DL configuration from the cell where the ACK/NACK response to the cell state signal is transmitted. Some examples include when cells using different UL-DL configurations are aggregated or cells using a TDD frame and an FDD frame are aggregated. In this case, m(n) may follow a rule determined by a cell aggregation combination.

Figure 11:
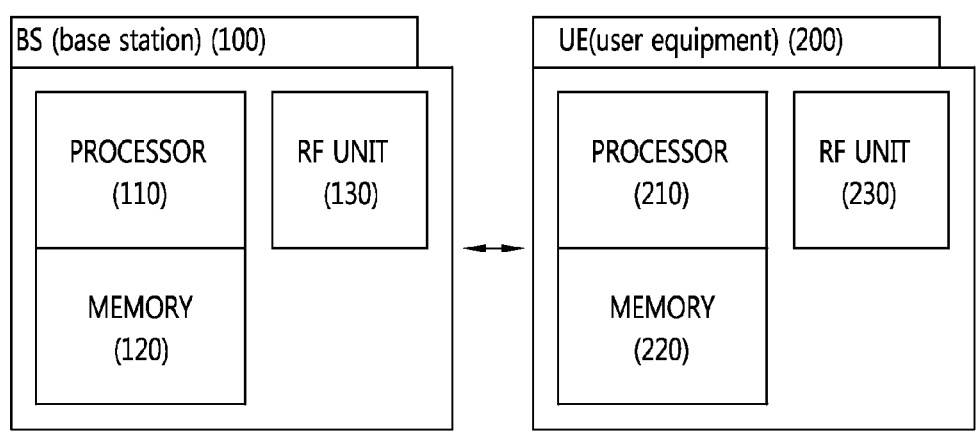
FIG. 11 is a block diagram illustrating a wireless device where an embodiment of the present invention is implemented.

FIG. 11 is a block diagram illustrating a wireless device where an embodiment of the present invention is implemented.

The base station 100 includes a processor 110, a memory 120, and a radio frequency (RF) unit 130. The processor 110 implements functions, processes, and/or methods as proposed herein. For example, the processor 110 may generate a cell state signal and may transmit the cell state signal to the UE. The cell state signal may include information indicating a switch of the symbol 100 to the ON/OFF state. The memory 120 is connected with the processor 110 and stores various types of information for driving the processor 110. The RF unit 130 is connected with the processor 110 and communicates radio signals. The base station 100 may be a base station providing the above-described small cell or macro cell.

The UE 200 includes a processor 210, a memory 220, and an RF unit 230. The processor 210 implements functions, processes, and/or methods as proposed herein. For example, the processor 210 receives a cell state signal from the small cell and performs communication with the small cell based on the cell state signal. When the cell state signal indicates a shift (transition) of the small cell to the OFF state, a delay request signal may be transmitted. An ACK/NACK may be transmitted responsive to the cell state signal. The memory 220 is connected with the processor 210 and stores various types of information for driving the processor 210. The RF unit 230 is connected with the processor 210 and communicates radio signals.

The processor 110, 210 may include Application-Specific Integrated Circuits (ASICs), other chipsets, logic circuits, and/or data processors. The memory 120, 220 may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory 120, 220 and executed by the processor 110, 210. The memory 120, 220 may be disposed to the processor internally or externally and connected to the processor 110, 210 using a variety of well-known means.

What is claimed is:

1. A method for performing communication by a user equipment (UE) in a wireless communication system, the method comprising:
receiving, from a small cell, downlink control information (DCI) masked with a Radio Network Temporary Identifier (RNTI), the RNTI being an RNTI which does not directly indicate a cell state of the small cell;
determining the cell state of the small cell based on the DCI; and
communicating with the small cell based on the cell state, wherein the cell state of the small cell is indirectly indicated by the DCI, and
wherein, if a predetermined combination of a hybrid automatic repeat request (HARQ) process number field and a downlink assignment index (DAI) field, which are included in the DCI, is satisfied, the DCI indicates that the cell state of the small cell is shifted to an OFF state.

2. The method of claim 1, wherein, when the shift for the cell state of the small cell to the OFF state is indicated, a radio resource allocated to an uplink channel to be transmitted to the small cell is released.

3. The method of claim 1, wherein the DCI is transmitted through a physical downlink control channel (PDCCH).

4. The method of claim 1, wherein a format of the DCI is a DCI format 1A.

5. The method of claim 1, wherein a cross carrier scheduling is transmitted by the small cell only when the small cell shifts from an ON state to the OFF state.

6. The method of claim 1, wherein a delay request signal is transmitted to the small cell, and wherein the delay request signal is a signal for requesting to delay the shift of the small cell to the OFF state.

7. The method of claim 1,
wherein information for the cell state is transmitted to a macro cell, and
wherein the macro cell is a cell controlling the small cell.

8. The method of claim 1,
wherein the communication is performed a predetermined time after a time when the DCI is received, and
wherein the predetermined time is set by a radio resource control (RRC) message.

9. The method of claim 1, wherein the RNTI being an RNTI which does not directly indicate a cell state of the small cell is one of a paging RNTI, random access RNTI, or system information RNTI.

10. A user equipment (UE), comprising:
a radio frequency (RF) unit that transmits and receives a radio signal; and
a processor connected with the RF unit and that:
receives, from a small cell, downlink control information (DCI) masked with a Radio Network Temporary Identifier (RNTI), the RNTI being an RNTI which does not directly indicate a cell state of the small cell,
determines the cell state of the small cell based on the DCI, and
communicates with the small cell based on the cell state,
wherein the cell state of the small cell is indirectly indicated by the DCI, and
wherein, if a predetermined combination of a hybrid automatic repeat request (HARQ) process number field and a downlink assignment index (DAI) field, which are included in the DCI, is satisfied, the DCI indicates that the cell state of the small cell is shifted to an OFF state.

\* \* \* \* \*